Aug. 3, 1954 R. S. BIDDULPH ET AL 2,685,615

VOICE-OPERATED DEVICE

Filed May 1, 1952 5 Sheets-Sheet 1

INVENTORS: R.S.BIDDULPH
K.H.DAVIS

BY Harry C. Hart

ATTORNEY

INVENTORS: R.S.BIDDULPH
K. H. DAVIS
BY Harry C. Hart
ATTORNEY

Aug. 3, 1954 R. S. BIDDULPH ET AL 2,685,615

VOICE-OPERATED DEVICE

Filed May 1, 1952 5 Sheets-Sheet 3

INVENTORS: R.S. BIDDULPH
K. H. DAVIS

BY Harry C. Hart

ATTORNEY

INVENTORS: R.S.BIDDULPH
K. H. DAVIS
BY Harry C. Hart
ATTORNEY

Aug. 3, 1954 R. S. BIDDULPH ET AL 2,685,615

VOICE-OPERATED DEVICE

Filed May 1, 1952 5 Sheets-Sheet 5

INVENTORS: R. S. BIDDULPH
K. H. DAVIS

BY Harry C. Hart
ATTORNEY

Patented Aug. 3, 1954 2,685,615

UNITED STATES PATENT OFFICE 2,685,615

VOICE-OPERATED DEVICE

Rulon S. Biddulph, Chatham, and Kingsbury H. Davis, Bernardsville, N. J., assignors to Bell Telephone Laboratories, Incorporated, New York, N. Y., a corporation of New York Application May 1, 1952, Serial No. 285,454

12 Claims. (Cl. 179—1)

This invention relates to signal identification and has for its principal object selectively to identify an incoming signal such as a spoken word as resembling one of a preassigned set of reference entities more nearly than it resembles any of the others.

Systems are known in which a speech sound is first broken down into its component frequencies and a signal is generated for each such component frequency, varying with it in time. These component signals are then employed to control the deflection of a cathode beam to cause it to trace a pattern on a screen. This pattern, whose dimensions are frequency, time, and intensity, is matched against each of a group of static reference space patterns which are built into the apparatus. When the incoming signal beam trace matches any of these reference patterns sufficiently closely, an identification signal is derived which is particular to the reference pattern in question, and which may be utilized to actuate the key of a typewriter, to establish a telephone connection, or the like. Such a system is shown in Davis-Potter Patent 2,575,909.

In the act of comprehending the sounds of human speech, the brain performs the phenomenal feats of extracting the same meaning from sounds which differ widely in pitch, loudness, speed of utterance, etc., and entirely different meanings from sounds which are very much alike, such as "six," "fix"; "four," "door," etc. It succeeds in picking out these features of spoken sounds which are most significant from the standpoint of meaning and in disregarding the others, even though they be physically predominant.

Any apparatus designed for automatic recognition of spoken words must be capable of similarly disregarding physical similarities and differences among spoken sounds which are not significant from the standpoint of meaning. To assist such apparatus to disregard such features, whether they be similarities or differences, it has already been suggested that appropriately proportioned margins of error or of tolerance be built into the apparatus so that, for example, when the analyzed components of the incoming sound match the pattern of reference components to within, say 85 per cent, the sound is accepted as a match and is otherwise rejected. This, however, is only a half measure because with some voices the incoming sound may never match the reference sufficiently well to fall within the preassigned tolerance, while with other voices a particular speech sound may fall within the tolerance of two or more of the references with the result that the apparatus accepts it as being ambiguous.

The present invention approaches the problem of matching the pattern of incoming signals to the pattern of reference signals by a different avenue. Instead of providing for acceptance or rejection on the basis of a pattern match within a preassigned margin of error or outside of it, it accepts every speech sound as matching that one of a group of reference sounds which it most nearly resembles. Thus, it operates on a "best match" basis instead of on a "match-no-match" basis. It is therefore open to the criticism that it accepts meaningless sounds as having meaning and in effect translates every incoming sound into one or other of its own references whether this is in accord with the speaker's intention or not. However, this criticism is a somewhat artificial one because, as a practical matter, the speaker using the apparatus may naturally be expected to speak the language which the apparatus is designed to "hear" and, if it contains a vocabulary of "words," to restrict himself to the words of that vocabulary. Therefore, within the limits imposed by this restriction, the apparatus of the present invention is in principle capable of a flexibility sufficient to accommodate accents, inflections, and other speaking habits which differ from one another as widely as they do in nature.

The invention, in one of its principal forms, is actualized by breaking down the entire frequency band of the incoming word into subbands, one containing the lower frequency components and another containing the higher frequency components, deriving a first signal which bears a definite functional relation to the frequencies of the lower frequency components, similarly deriving a second signal which bears the same functional relation to the frequencies of the higher frequency components, and plotting one of these signals against the other on a receptive medium. For a steady tone, such a plot is merely a spot or point; but as the component frequencies change with time, the spot moves about on the medium as a trace which is representative of and individual to the incoming word and independent of the amplitudes of its components. A number of space patterns are provided, one for each word of a preassigned limited vocabulary, each of which is a plot of the higher component frequency signal of a reference word against its lower component frequency signal in the same coordinates as the incoming word trace. The latter thus coincides with or resembles one of these patterns more nearly than it does any of the others, quite apart from the degree of exactness of the coincidence itself. Means are provided for deriving a signal which identifies the reference pattern with which this best match takes place.

In one form a number of cathode beam tubes are provided, one for each word of the vocabulary, and each of them is provided with a reference space pattern in the form of a mask. The incoming word trace is actualized as movement of the cathode beam, or of a light beam derived from it, over the area on which the reference pattern appears. Coincidence of the trace with the pattern is registered through the medium of photoelectric devices.

In a more refined form of the invention the area on which the incoming word trace is plotted is quantized into a number of sub-areas, each of which has the dimensions $\Delta f_1$, $\Delta f_2$, where $\Delta f_1$ represents the extent of the change in the lower band signal in going from one side of the sub-area to the other while $\Delta f_2$ represents the extent of the change in the upper band signal ingoing from the lower margin of the sub-area to its upper margin. A reference pattern is then embodied in this quantized area by assigning to each sub-area a number which is representative of the fractional time which the trace of an incoming word may be expected to dwell in that area. The dwell of the trace itself is then effectively multiplied by this assigned number and the resulting products are summed. By this device it becomes possible to embody all of the reference space patterns in the one area, thus doing away with the need for a number of cathode beam tubes equal to the number of words in the vocabulary.

The invention will be fully apprehended from the following detailed description of preferred embodiments thereof taken in connection with the appended drawings in which.

Figure 1:
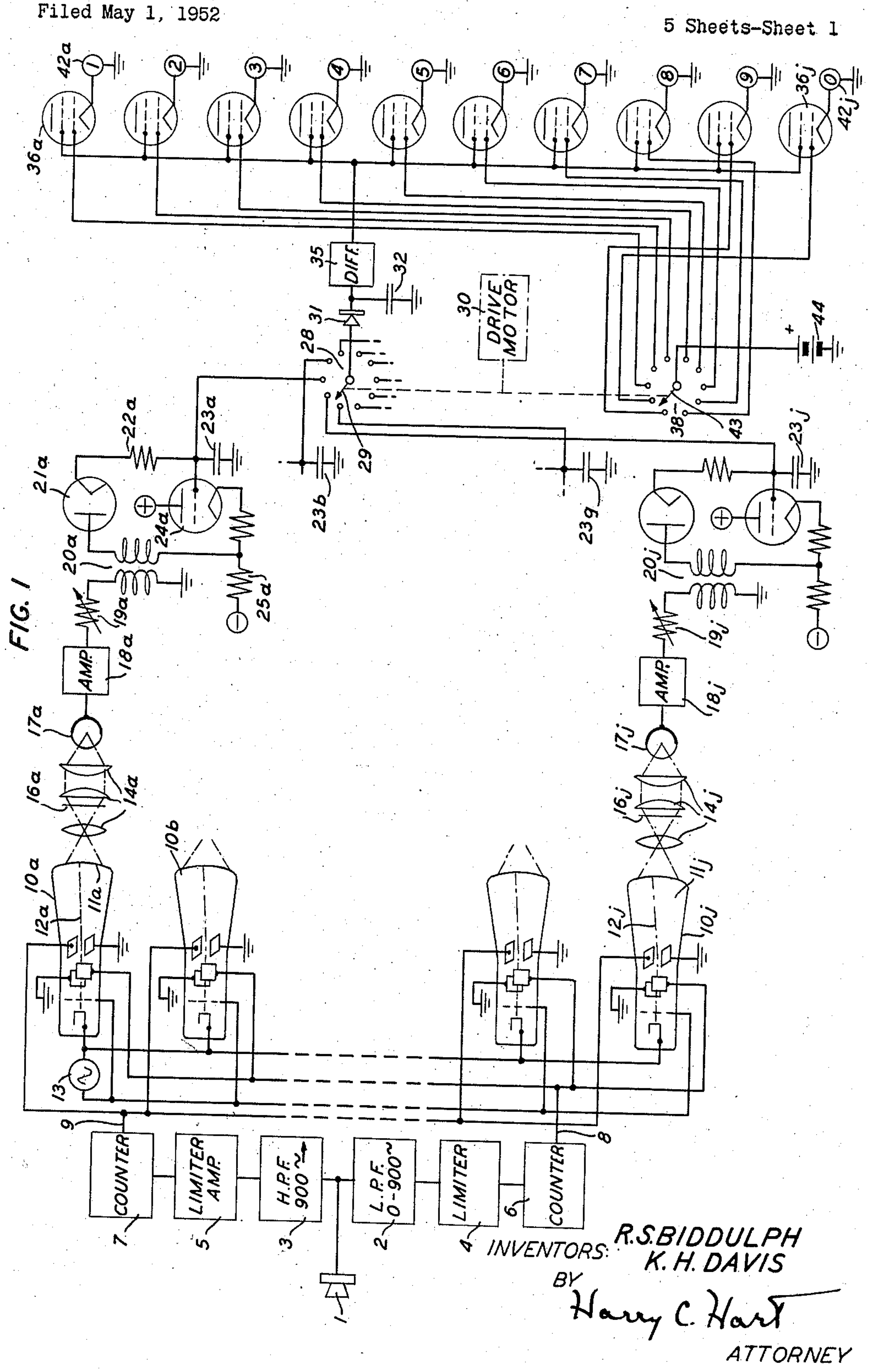
Fig. 1 is a schematic circuit diagram showing word-identification apparatus in accordance with the invention in one form.

Referring now to the drawings and in particular to Fig. 1, the sound of a spoken word to be identified is converted as by a microphone 1 into its electrical counterpart. The resulting wave is now split into an upper frequency sub-band and a lower frequency sub-band by two filters 2, 3 whose pass bands extend respectively from zero frequency to some mid-frequency such as 900 cycles per second for the low pass filter 2 and, for the high pass filter 3, from this mid-frequency to the highest voice frequency of interest. In each path a limiting amplifier 4, 5 follows the filter. Its function is to eliminate or reduce the effects of amplitude differences among the various voice components. The frequency of the predominant component which appears in each of these paths is then determined as by a cycle counter 6, 7. The latter may be of any desired variety, a preferred construction being disclosed, for example, in Riesz Patent 2,522,539. The signals appearing on the output terminals 8, 9 of these counters are thus proportional respectively to the frequency of the predominant component in the lower sub-band and to the frequency of the predominant component in the upper sub-band and are independent of the amplitudes or magnitudes of these components, absolute or relative.

The lower band signal on the conductor 8 is now applied in multiple to the horizontal deflection plates of all of a group of cathode beam tubes 10*a*–10*j* while the upper band signal is similarly applied in multiple to all of the vertical deflection plates of the same tubes. Each of these tubes may be of conventional construction including electro-optical accelerating and focusing elements not shown, and a luminescent screen 11 on the inside face of its end wall. The beam 12 which originates at the cathode of each tube is modulated at a frequency, for example, of 1000 cycles per second by a generator 13 connected between the cathode of the tube and its control grid.

Passing for the moment the function and effect of this modulation there are associated with the several beam tubes a number of masks 16*a*–16*j*, each of which may be a photographic film which has been prepared in a fashion to be described, a group of photoelectric cells 17*a*–17*j* and optical elements 14 which act to focus the luminous spot on the enlarged end of each tube 10 onto its mask 16 and thereafter to focus the light which passes the mask onto the photocell 17. Each of the photocells is connected by way of an amplifier 18 and a trimming resistor 19 to the primary winding of a transformer 20. One terminal of the secondary winding of this transformer is connected to the anode of a rectifier diode 21 whose cathode is connected by way of a resistor 22 to one terminal of a holding condenser 23 whose other terminal is grounded. The other terminal of the secondary winding is connected to the cathode of a triode 24 which is provided with a cathode resistor 25. Its anode is connected to the positive terminal of a conventional potential source whose negative terminal is connected to the free end of the cathode resistor 25 while its control grid is connected to the ungrounded terminal of the holding condenser 23. These ungrounded holding condenser terminals are individually connected to the several segments of a distributor 28 which is here shown for the sake of simplicity of explanation as a mechanical commutator. The wiper arm 29 of this commutator, which is driven at constant speed as by a motor 30 to make contact with these terminals in regular sequence, is connected by way of a diode rectifier 31 to one terminal of another holding condenser 32 whose other terminal is grounded.

Figure 1A:
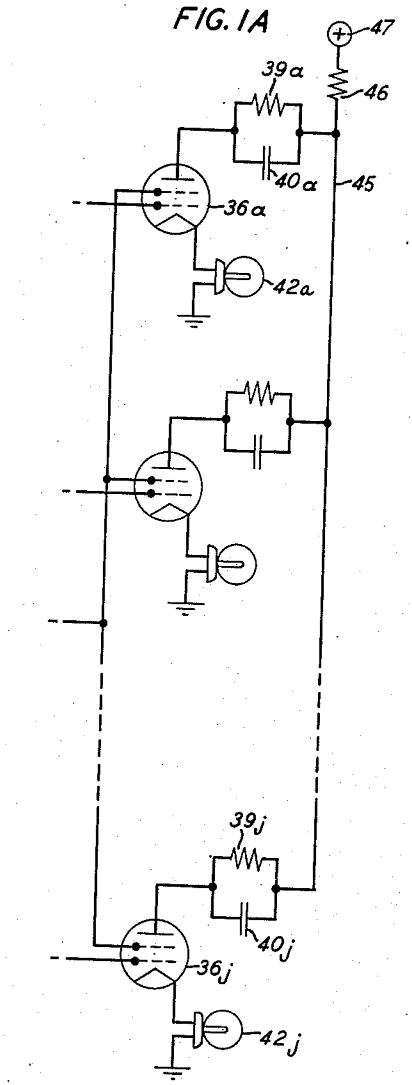
Fig. 1A is a schematic circuit diagram showing the details of a part of the apparatus of Fig. 1.

At the right-hand end of the drawing is shown a bank of gas discharge tubes 36*a*–36*j*, one for each point of the distributor 28. Like electrodes of these tubes, for example their No. 1 control grids, are connected together and, by way of a differentiating network 35 to the ungrounded terminal of the condenser 32. The No. 2 control grids of these several tubes are individually connected to the several terminals of another distributor 38 which is again shown for the sake of simplicity of description as a mechanical commutator. The anode of each of these tubes 36 is connected (Fig. 1A) by way of a resistor and a condenser in parallel to a conductor 45 which is in turn connected by way of a common resistor 46 to the positive terminal 47 of a potential source whose negative terminal may be grounded. The cathodes of all of these tubes are connected by way of individual lamps 42 to ground. The wiper arm 43 of the lower distributor 38 is connected to a suitable enabling voltage source 44, for example the positive terminal of a battery whose negative terminal is connected to ground. The two distributors 28, 38, are driven together in synchronism and in phase by the motor drive 30. With this arrangement the gas tubes 36 of the bank are partially enabled in serial order by the application to them consecutively of the voltage of the battery 44 by way of the lower distributor 38. At the same time each change in the voltage of the holding condenser 32 is applied to their No. 1 control grids in parallel.

When one of the words of the selected vocabulary is pronounced, the cathode beam 12 of each tube 10 traces a figure on the luminescent screen 11 which covers its enlarged end. By virtue of the connection of the beam-deflecting elements of these tubes together in multiple, the figures traced on the screens 11 of these several tubes for any single pronounced word are identical, and this figure is individual and specific to the word pronounced in the sense that a different figure will appear on the tube screens for the pronouncement of any other word, or at least of any word in which the progress in time of the frequency of the predominant component of the lower sub-band and the progress in time of the frequency of the predominant component in the upper sub-band are not identical.

Figure 5:
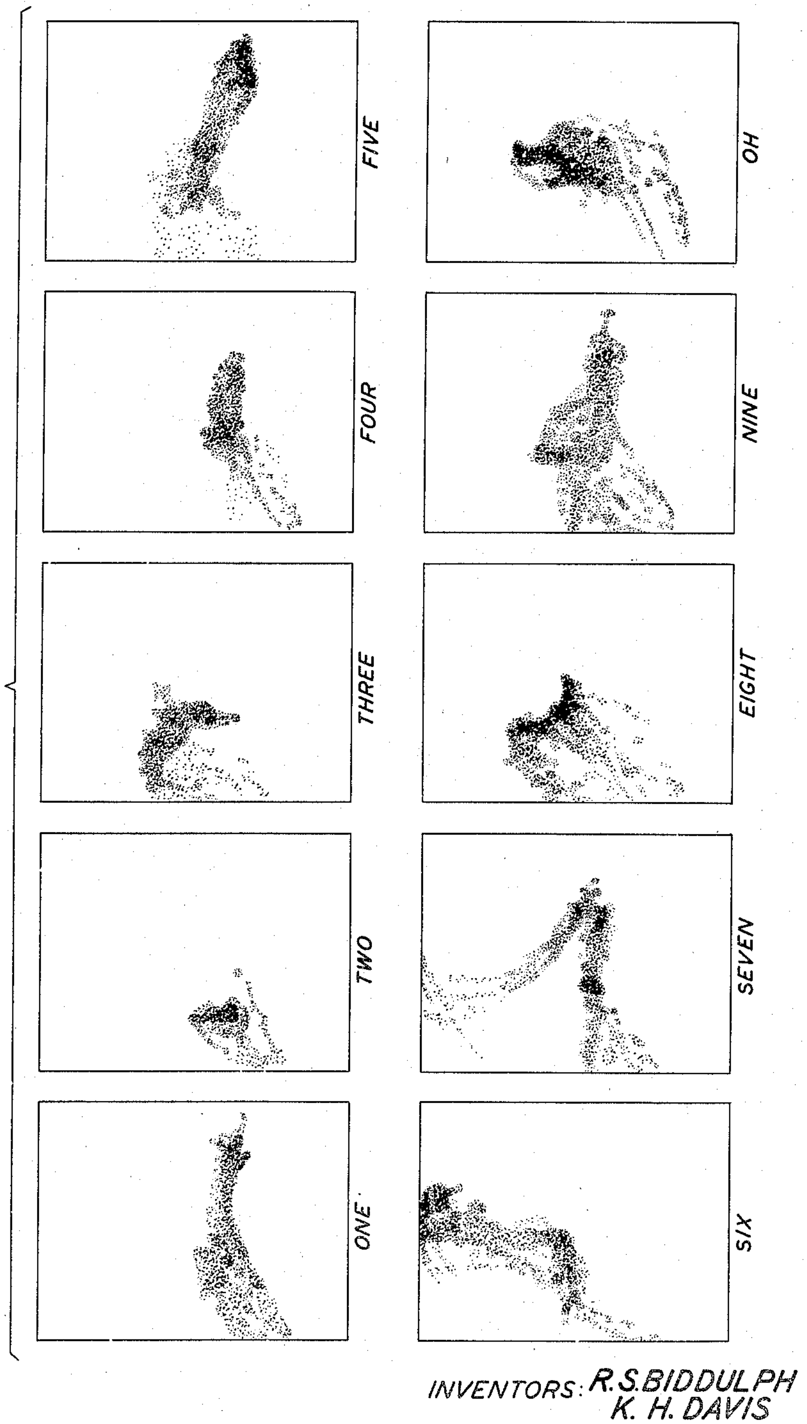
Fig. 5 shows a group of space pattern optical masks which may be employed in the apparatus of Fig. 1.

Each of the several masks 16 is in fact a reference space pattern conforming to one or other of these vocabulary figures. It may conveniently be constructed by focusing the light spot which appears on the face of the tube 10 onto an unexposed photographic film and pronouncing the selected word a number of times in succession in order to average out miscellaneous minor differences in the figure. The film, after development, contains a pattern which results from exposure to these several traces, and a photographic positive made from this film can serve as the reference pattern mask for the selected word. The other masks of the group may be similarly constructed. The ten masks of such a group, one for each of the words "One," "Two," "Three," . . . Oh," are shown in Fig. 5.

The light transmission of the several masks must of course be normalized both as to its average value and as to the standard deviation of this average value as between each mask and each of the others. Both of these normalization steps are conveniently carried out in the development process of the films merely by developing all the films to the same average optical density and the same contrast. The effects of refined adjustments of contrast may be conveniently secured by the provision of adjustable gain or attenuation in the output of each of the several photocells. To this end, the variable resistor 19 is connected in the output of each of the photocell amplifiers 18 which may be manually adjusted to give the required normalized current inputs to the several following diodes 21.

The several reference pattern masks 16 are set up between the tube screens 11 and the photocells 17 along with appropriate light focusing elements 14 in the fashion shown in Fig. 1. Now when an incoming spoken word is to be identified, the talker speaking into the microphone 1, his voice is similarly analyzed and the beam 12 of each tube 10 executes a trace on its luminescent screen 11, the traces being identical. Because this trace resembles the space pattern on one of the reference masks 16 more closely than that on any of the others, the photocell 17 which is placed behind this particular mask 16 receives a greater quantity of illumination than does any of the other photocells. The photocell output, after amplification and passage through the trimming resistor 19, is applied by way of the transformer 20 to the diode rectifier 21.

By virtue of the 1000 cycle modulation applied to the beams of the several cathode beam tubes from the source 13, the wave passing through the transformer 20 is a sinusoid whose amplitude, however, varies with time according as the image of the bright spot on the end of the tube 10 strikes a comparatively opaque portion of the mask 16 or a comparatively clear one. This wave is rectified by the combination of the diode 21 and the resistor 22, and the holding condenser 23 is charged by the rectifier output at a rate which is thus proportional to the envelope of the wave. The inclusion of the triode 24 whose control grid is connected to the ungrounded terminal of the condenser 23 serves by virtue of its cathode-follower action to keep this charging rate independent of the degree to which this condenser 23 has been charged.

The total charge on the condenser is proportional to this rate and inversely proportional to the speed with which the bright spot executes its trace on the luminescent screen 11.

Figure 2:
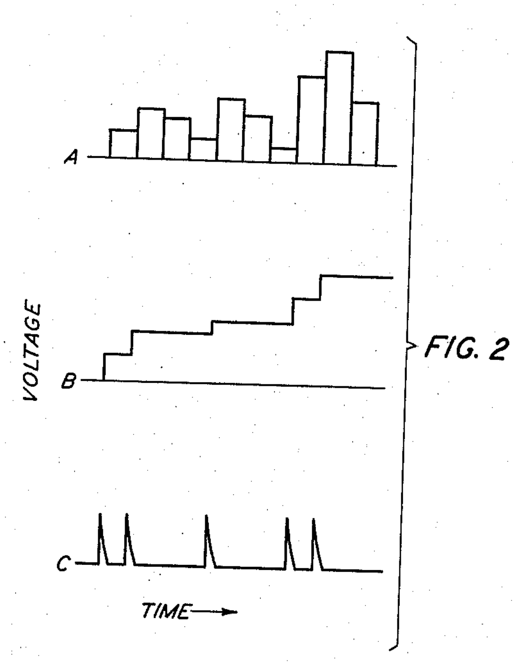
Fig. 2 shows a group of wave forms of assistance in explaining the operation of the apparatus of Fig. 1.

The charges thus placed on the several condensers 23*a*—23*h* of the bank are now sampled in sequence by the upper distributor 28 and, after rectification by the diode rectifier 31, are held by the condenser 32. The differentiating circuit 35 passes a positive pulse each time the charge on this condenser 32 is increased in a positive direction. The rectifier 31 prevents reduction of the condenser charge. Suppose, for example, that the magnitudes of the charges on the respective holding condensers are as shown by curve A of Fig. 2. The ninth charge is the greatest, as will be the case when the incoming spoken word is "nine." Then the charge on the holding condenser 32, which never decreases during the cycle but which increases each time the wiper arm 29 makes contact with a condenser whose charge is greater than the charges of other condensers earlier contacted in the cycle, has the form of curve B of Fig. 2. The differentiating network converts this condenser charge into a group of positive pulses as shown in curve C of Fig. 2, from which it appears in the example shown that a positive pulse occurs for holding condensers Nos. 1, 2, 5, 8, and 9. These pulses are applied as stated above to the No. 1 control grids of the gas tubes 36 of the bank. These tubes are partially enabled in sequence by application of the battery voltage from the lower distributor 38 to their No. 2 control grids individually. Thus, in the first cycle of operation in the example shown, tubes Nos. 1, 2, 5, 8, and 9 are ignited. By virtue of the resistor-condenser combinations 39, 40 which are individual to the anodes of these gas tubes 36 and the further common resistor 41, ignition of any of these gas tubes 36 operates to extinguish the one earlier ignited. Therefore in this cycle, when tube No. 9 is ignited, tube No. 8 is extinguished, tubes 1, 2, and 5 having been earlier extinguished, and No. 9 remains ignited to indicate that the cathode beam trace of the incoming word resembles the space pattern of the No. 9 mask 16*g* more closely than it does any of the others. On the next cycle of operation of the distributor 28, the charge on the holding condenser 32 has already been raised to the value of that on the No. 9 holding condenser 23*g*, wherefore no further increases occur during the passage of the wiper arm 29 over the first eight segments of the commutator 28 and the pulses of curve C prior to the last one do not occur. A small pulse occurs for the No. 9 holding condenser 16*g* due only to the small decay of the charge on the condenser 32 through leakage in the course of a cycle.

Had the incoming word been "four" for example, the charge on the No. 4 holding condenser 23*d* would have been greater in magnitude than any of the others and the pulse of curve C in the fourth pulse position of the cycle would have been the last to occur and would be the only one to be repeated in later cycles of operation, being so repeated by way of leakage out of the condenser.

The apparatus of Fig. 1 is generous in the sense that an individual beam tube 10 and an individual space reference pattern mask 16 must be provided for each word of the vocabulary. The apparatus of Fig. 3 obviates this difficulty and provides a reference space pattern for all of the words of the vocabulary on a single area. The analysis of the incoming word is carried out in exactly the same fashion as in the case of Fig. 1 to give rise on the screen of the single cathode beam tube 50 to a trace which is individual and peculiar to the word being spoken. The luminous spot which thus appears on the face of the tube is focused as by a lens 53 onto a number, for example 30, of photoelectrically sensitive areas (Fig. 3A) arranged in a 5 x 6 rectangular array in a focal plane 55. The photosensitive output currents are amplified by individual amplifiers of which only the first few, A1–1, A1–2, A1–3, and the last one, namely A5–6, are shown. The output terminal of each of these amplifiers is connected to the winding of a relay B1–1, B1–2 . . . B5–6, provided with 10 contacts. Each of the relays thus receives the output of one of the photosensitive areas into which the focal plane 55 is broken and quantized, and therefore measures the light flux falling on it. For each such relay one contact is provided for each of the words of the vocabulary which the apparatus is intended to recognize, there being in the present example 10 words and therefore 10 such contacts. The No. 1 contacts of all of the several relays are connected through resistors $R_1$ (1–1), $R_1$ (1–2), . . . $R_1$ (5–6) to a common conductor 60 and to one terminal of a first holding condenser $C_1$ whose other terminal is grounded. Similarly, the No. 2 contacts of the several relays are connected by way of individual resistors $R_2$ (1–1), $R_2$ (1–2), . . . $R_2$ (6–5) to another common conductor 61 and to the ungrounded terminal of a second holding condenser $C_2$ and so on. The remainder of the apparatus is identical with that heretofore described in connection with Fig. 1, both in construction and in operation. In this arrangement it is the magnitudes of the resistors of the relays B1–1, B1–2, etc., which serve as the counterpart of the several masks 16 in Fig. 1. To select the proper magnitudes for the resistors, it is only necessary to determine empirically for the pronouncement of each word of the vocabulary the fraction of the total time required for the complete cathode beam trace during which it dwells in each of the quantized sub-areas into which the focal plane 55 is subdivided. This is conveniently done by measuring the magnitude of the current output of each photosensitive area and the time through which it endures or, more simply, by connecting the several contacts of the relays B1–1, B1–2, etc., by way of like high resistors to individual like condensers and measuring the charge which is placed on each of these condensers in the course of the trace. This process is then preferably repeated a number of times to the end that spurious deviations may be averaged out or minimized. The data obtained from these measurements are now converted into the magnitudes of a group of resistors which, when connected in the fashion shown in Fig. 3, restrict the several photocell output currents to these same values for the same incoming word, and so to the same condenser charges. The magnitudes of these resistors must now of course be normalized for standard deviation among the several words of the vocabulary. This normalization process may be carried out mathematically by well-known techniques and when employed gives rise to resistance values for each of the 10 contact resistors on every one of the 30 relays B1–1, B1–2 . . . B5–6. Such resistance values are set forth, for a normal male voice, in the following table. In this table an entry "–" means that the value of the resistance is infinite; i. e., it is removed and the circuit is open. The large number of such entries is due to the very restricted character of the vocabulary represented by the first ten words of the number series. For a different vocabulary the entries of the table would be different.

RELAY CONTACT RESISTANCES IN MEGOHMS

| Relay No. | Contact Numbers | | | | | | | | | |
|---|---|---|---|---|---|---|---|---|---|---|
| | 1 | 2 | 3 | 4 | 5 | 6 | 7 | 8 | 9 | 10 |
| 1-1 | – | – | – | – | – | – | – | – | – | – |
| 1-2 | 1.25 | 1.17 | 10.79 | – | 13.76 | – | 2.44 | – | 2.94 | 6.28 |
| 1-3 | 2.15 | 6.85 | – | 3.75 | 6.67 | – | 4.20 | – | – | 1.28 |
| 1-4 | 5.73 | – | – | 1.05 | 3.28 | – | – | – | – | 1.42 |
| 1-5 | 3.80 | – | – | 7.04 | 3.94 | – | – | – | – | – |
| 1-6 | 9.15 | – | – | – | – | – | – | – | – | – |
| 2-1 | 13.27 | – | 4.49 | 2.88 | 3.49 | 9.80 | – | 7.77 | – | – |
| 2-2 | 5.56 | 2.56 | 2.51 | – | – | – | – | 10.14 | 4.02 | – |
| 2-3 | 8.72 | 2.16 | 4.53 | 7.58 | – | 6.07 | 3.34 | – | 2.33 | – |
| 2-4 | 3.77 | – | – | 4.92 | 1.50 | 15.46 | 2.36 | – | 1.55 | 8.20 |
| 2-5 | 3.09 | – | – | – | 1.52 | – | 4.78 | – | 1.70 | – |
| 2-6 | – | – | – | – | 15.31 | – | – | – | – | – |
| 3-1 | – | – | 8.72 | 6.79 | 3.57 | 12.50 | – | 10.34 | – | – |
| 3-2 | – | 3.26 | 1.15 | – | – | 15.15 | – | 2.82 | 12.00 | – |
| 3-3 | – | 4.76 | 2.63 | – | – | 4.30 | – | 1.13 | 4.09 | – |
| 3-4 | – | – | – | – | – | – | – | 10.20 | – | – |
| 3-5 | – | – | – | – | – | – | – | – | – | – |
| 3-6 | – | – | – | – | – | – | – | – | – | – |
| 4-1 | – | – | – | 10.14 | – | 12.30 | – | 6.00 | – | – |
| 4-2 | – | – | – | – | – | – | – | 7.65 | – | – |
| 4-3 | – | – | – | – | – | – | – | 7.85 | – | – |
| 4-4 | – | – | – | – | – | – | – | – | – | – |
| 4-5 | – | – | – | – | – | – | – | – | – | – |
| 4-6 | – | – | – | – | – | – | – | – | – | – |
| 5-1 | – | – | – | – | – | 1.00 | 1.25 | 3.26 | – | – |
| 5-2 | – | – | – | – | – | 4.44 | 12.50 | 8.11 | – | – |
| 5-3 | – | – | – | – | – | – | – | – | – | – |
| 5-4 | – | – | – | – | – | – | – | – | – | – |

Figures 3, 3A:
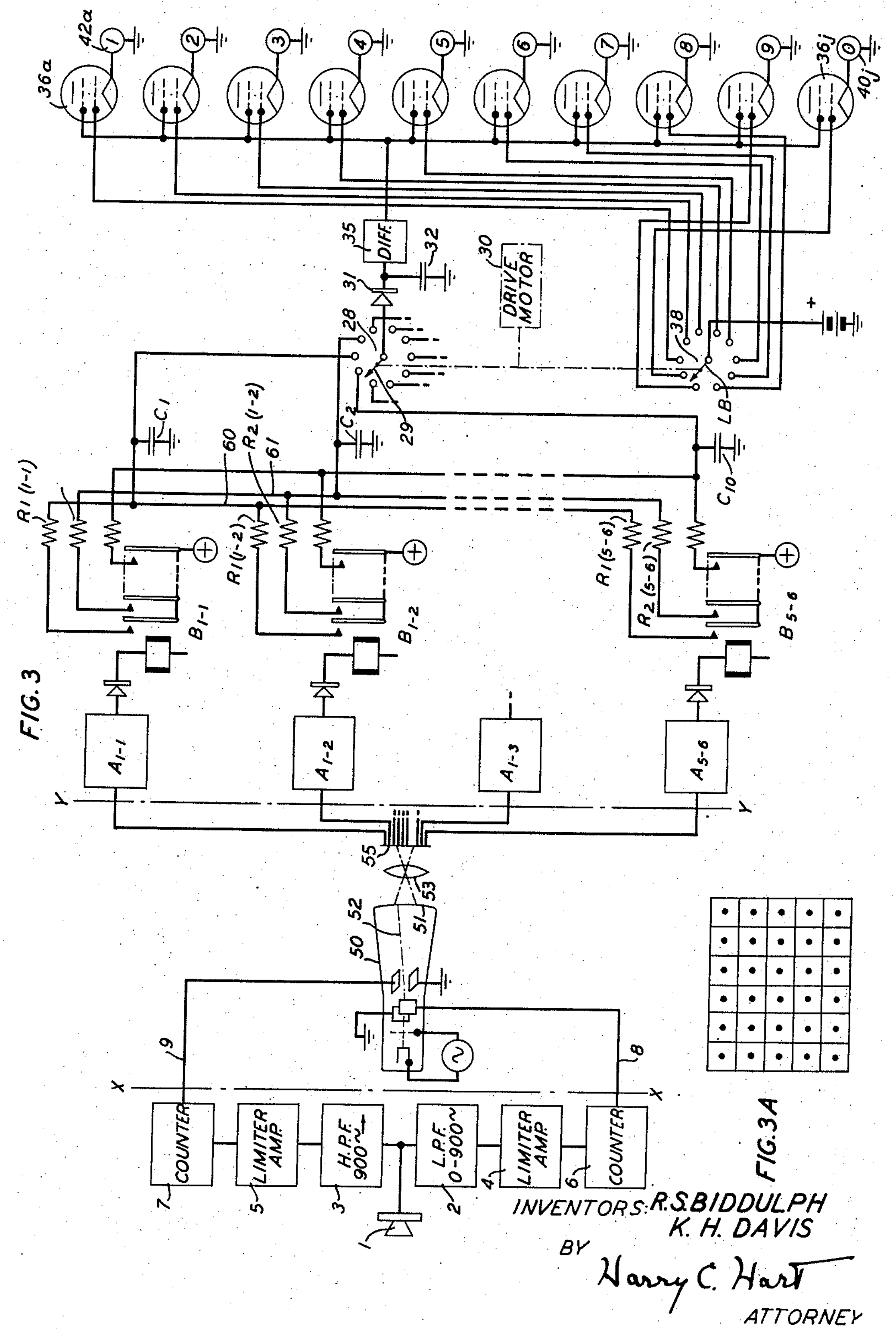
Fig. 3 is a schematic diagram of word-identification apparatus alternative to that of Fig. 1.
Fig. 3A is an end view of the focal plane 55 of Fig. 3.

The 10 cathode beam tubes of Fig. 1 have been reduced to the one beam tube of Fig. 3 at the price of a somewhat awkward and expensive array of photocells. Resort to this photocell array and the employment of the cathode beam tube may both be avoided by substituting a group of gating devices such as gas tubes interconnected as shown in Fig. 4 which may be substituted between the broken lines X—X and Y—Y of Fig. 3 without other change in the apparatus.

Figure 4:
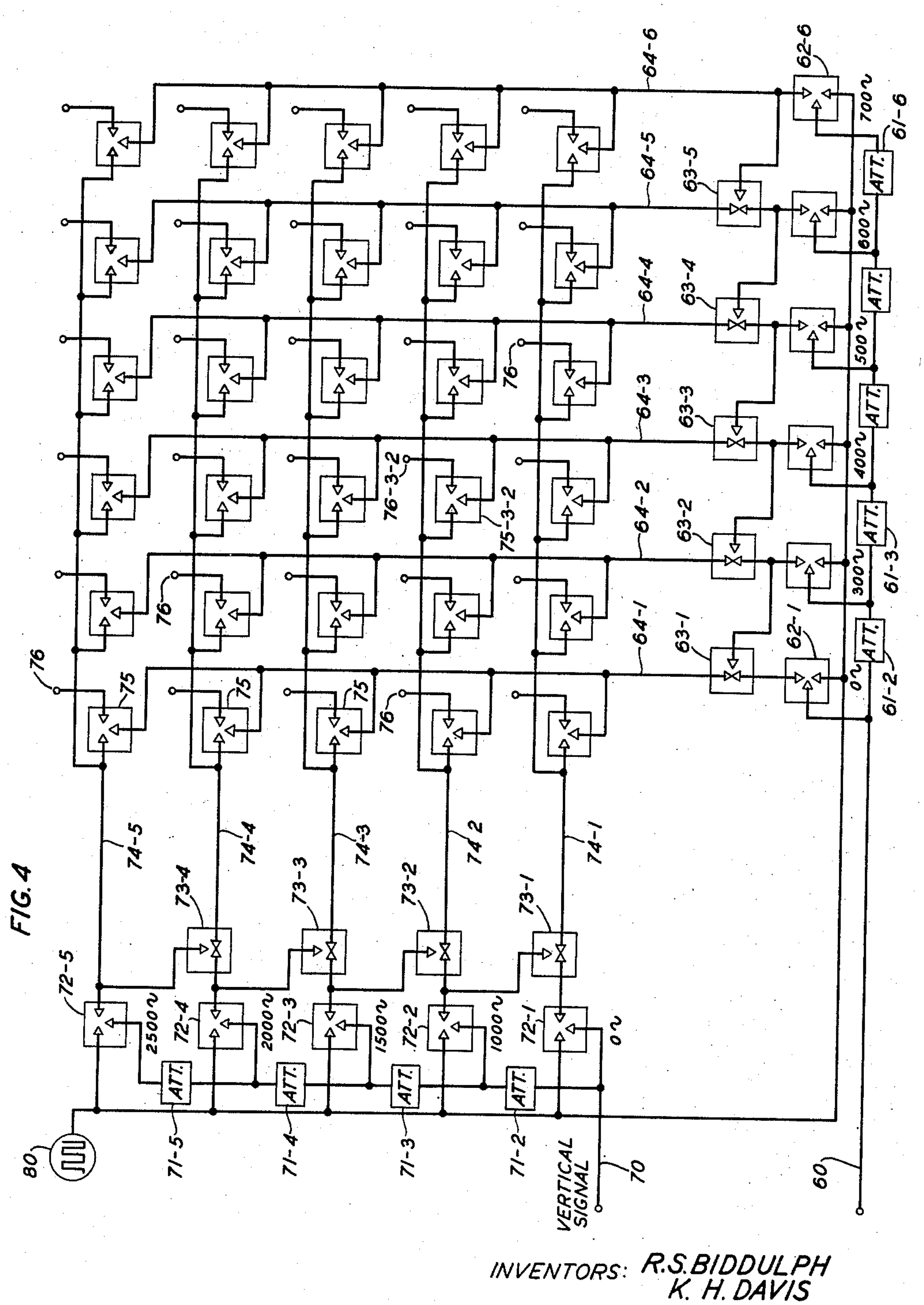
Fig. 4 is a block schematic diagram of apparatus alternative to that portion of Fig. 3 included between the lines X—X and Y—Y.

Referring now in detail to Fig. 4, the "horizontal signal" which is the output of the cycle counter in the upper frequency band path is applied to a conductor 60 and through attenuators 61–1 to 61–4 in series to the control terminals of a group of "horizontal" gates 62–1 to 62–5. Similarly, the "vertical signal" which is the output of the cycle counter in the lower frequency band path is applied to a conductor 70 and through attenuators 71–1 to 71–6 to the control terminals of a group of "vertical" gates 72–1 to 72–6. Each of these gates 62, 72 is shown in the form of two opposing arrowheads together with a third arrowhead pointing toward the junction of the first two. Following a well-known convention, the first two arrowheads represent conduction terminals and they are shown normally out of contact to indicate that the path through them is normally disestablished, to be established upon the application of a control signal to the third arrowhead as a control terminal.

Energy is applied to the input conduction terminals of all of these gates in parallel from a wave source 80, for example a source of pulses having a repetition rate of 1000 cycles per second or so.

While the operations to be described might equally well be carried out by the provision of various biases for the several gates, it is preferred rather to accomplish the same purpose by attenuation of the control signals applied to them. Thus the horizontal signal is applied in its full strength to the first horizontal gate 62–1; it is applied to the second horizontal gate 62–2 after some reduction in its strength by an attenuator 61–2 so as to hold this gate 62–2 unoperated until the horizontal frequency reaches 300 cycles, and it is further reduced in strength by another attenuator 61–3 before application to the third horizontal gate 62–3 so that the latter remains unoperated until the horizontal signal reaches 400 cycles and so on. Similarly, the vertical signal is applied with its full strength to the first vertical gate 72–1 and is thereupon reduced in strength by an attenuator 71–2 so that the second vertical gate 72–2 remains unoperated until the vertical frequency reaches 1000 cycles. It is applied to the third vertical gate 72–3 by way of another attenuator 71–3 so that the third gate remains unoperated until the vertical frequency reaches 1500 cycles and so on. With this arrangement as the horizontal frequency signal increases progressively from its lowest frequency to its highest, the first horizontal gate 62–1 is operated from the start, the second 62–2 comes into operation when the frequency reaches 300 cycles and remains in operation for all higher frequencies, the third 62–3 comes into operation when the frequency reaches 400 cycles and remains in operation for all higher frequencies and so on. Similarly, for a progressive increase in the vertical frequency signal, the first vertical gate 72–1 is operated from the start and the others come into operation in sequence as the vertical frequency passes the values 1000 cycles, 1500 cycles, 2000 cycles, 2500 cycles, each one remaining in operation as long as the frequency of the vertical signal is equal or greater than that at which the gate first comes into operation.

In the output path of each of these gates 62, 72 except the last one, is another gate 63, 73 which is here symbolically shown in the form of two opposing arrowheads and a third arrowhead pointing toward the junction of the first two. Following the same convention, the first two arrowheads represent conduction terminals and they are shown in mutual contact to indicate that the path through them is normally established, to be disestablished upon the application of a control signal to the third arrowhead. Such a control signal is applied to the third arrowhead of each gate 63, 73 from the output of the gate of the next higher degree. Thus, the path through the second gate 73–2 becomes established in the fashion described above when the vertical frequency reaches 1000 cycles and is disestablished by the output of the third gate 72–3 when the vertical frequency reaches 1500 cycles, and so on. The same provision is made for the horizontal gates. This construction gives rise to energy on the horizontal "slot" conductors 64 which is a quantized counterpart of the horizontal signal frequency, the quantization being in steps of 100 cycles per second. Similarly, the energy on the vertical "slot" conductors 74 is a quantized counterpart of the vertical signal frequency, the quantization being in steps of 500 cycles.

To the right of the vertical slot conductors and above the horizontal slot conductors is an array of gates 75 which are shown by the same arrowhead convention, the opposed arrowheads representing energy path terminals and the third, which faces the junction of the first two, representing a control terminal. Now, however, because the energy path in each case is normally disestablished, to be established by the application of a control signal, the opposed arrowheads are shown separated.

This arrangement evidently gives rise to energy on one and only one of the output terminals 76 of the array at a time. For example, when the vertical frequency lies anywhere in the range 1000–1500 cycles per second, the second vertical slot conductor 74–2 is energized and the input conduction terminal of each of the gates 75 of the second row of the array has applied to it energy of the 1000 cycle source 80. Suppose, further, that the horizontal signal lies in the range 400–500 cycles per second. As explained above, this acts to energize the third horizontal "slot" conductor 64–3 and so to establish conduction paths through all of the gates 75 of the third column of the array. Establishment of these paths in the case of the first, third, fourth, and fifth gates 75 is of no consequence, no energy having been applied to their conduction terminals. In the case of the second gate 75–3–2, however, energy of the source 80 has been applied to its conduction terminals as described above so that establishment of the path through it results in the energization of the single output terminal 76–3–2 and no others.

The several output terminals 76 of the array are to be understood as being individually connected to the several amplifiers of Fig. 3 which were described in that connection as photocell amplifiers but which, in the modification of Fig. 4, serve as amplifiers for the energy which passes one or other of the gates 75 of the array of Fig. 4.

From here on, the circuit of Fig. 3 and its operation have been fully described above.

What is claimed is:

1. Apparatus for identifying a complex signal having a plurality of different frequency components which comprises means for segregating the higher frequency components of said signal from its lower frequency components, means for deriving a first control signal which bears a preassigned functional relation to said higher frequency components, means for deriving a second control signal which bears a preassigned functional relation to said lower frequency components, means for plotting one of said control signals against the other on a receptive medium as a trace which is representative of and individual to said complex signal independently of the amplitudes of its components, a space pattern in juxtaposition with said medium which is similarly representative of a reference signal, and means for deriving an identification signal from substantial coincidence of said trace with said pattern.

2. Apparatus as defined in claim 1 in which the first control signal is representative of the frequency of the predominant one of the higher frequency components and the second control signal is representative of the frequency of the predominant one of the lower frequency components.

3. Apparatus as defined in claim 1, wherein said plotting means comprises a cathode beam tube having beam generating means, beam deflecting means, and a beam-sensitive luminescent screen, whereby the trace which is representative of and individual to the complex signal to be identified, appears as a luminous trace on said screen.

4. Apparatus as defined in claim 3 wherein the space pattern is a mask whose light transmissive areas are located in one direction parallel with its plane as a function of the frequency of a lower frequency component of a reference signal and are located in another direction parallel with its plane as a preassigned function of the frequency of a higher frequency component of a reference signal, said mask being positioned adjacent to the luminescent screen of the cathode beam tube.

5. Apparatus as defined in claim 4 wherein the means for deriving an identification signal from substantial coincidence of the trace with the pattern comprises means for determining the intensity of the light originating at the luminescent screen due to incidence on the screen by the cathode beam and traversing the mask, and means for integrating said light intensity for determining the total flux of light through said mask.

6. Apparatus for identifying a complex signal having a plurality of different frequency components as resembling one of a preassigned number of different reference signals more closely than it resembles any of the others which comprises means for segregating the higher frequency components of said signal from its lower frequency components, means for deriving a first control signal which bears a preassigned functional relation to said higher frequency components, means for deriving a second control signal which bears a preassigned functional relation to said lower frequency components, a plurality of similar plotting means each of which comprises a receptive medium and means for plotting one of said control signals against the other on said medium as a trace which is representative of and individual to said complex signal independently of the amplitudes of its components, a space pattern in juxtaposition with each of said media, each such space pattern being similarly representative of a selected one of said reference signals, there being one such space pattern for each such reference signal, means for determining the degree of coincidence of each trace on one of said media with the space pattern juxtaposed therewith, and means for identifying that one of said space patterns with which said coincidence is greatest.

7. Apparatus as defined in claim 6, wherein each of said plotting means comprises a cathode beam tube having beam generating means, beam deflecting means, and a beam-sensitive luminescent screen, whereby the luminous trace, representative of and individual to the complex signal to be identified, appears on said screen.

8. Apparatus for identifying a complex signal having a plurality of different frequency components as resembling one of a preassigned number of different reference signals more closely than it resembles any of the others which comprises means for breaking down said complex signal into two differently significant components, a plurality of similar plotting means each of which comprises a receptive medium and means for plotting one of said components aagainst the other on said medium as a trace which is representative of and individual to said complex signal, a space pattern in juxtaposition with each of said media, each such space pattern being similarly representative of a selected one of said reference signals, there being one such space pattern for each such reference signal, means for determining the degree of coincidence of each trace on one of said media with the space pattern juxtaposed therewith and means for identifying that one of said space patterns with which said coincidence is greatest.

9. In signal identification apparatus, a plurality of gates arranged in a rectangular array of rows and columns, a horizontal conductor adapted to carry a signal which may increase progressively from one end of a preassigned horizontal signal range to the other end of said range, means actuated by said signal for partially energizing all of the gates of a single one of said columns for values of said signal within a preassigned subdivision of said range and for similarly partially energizing all of the gates of each other column for values of said signal within each other subdivision of said range, a vertical conductor adapted to carry a vertical signal which may increase progressively from one end of a preassigned vertical signal range to the other end of said range, means actuated by the signal on said vertical conductor for partially energizing all the gates of one horizontal row for values of said signal within a preassigned subdivision of said last-named range and for similarly partially energizing all of the gates of each of the other horizontal rows for values of said signal within each other such vertical signal subdivision of said range, whereby only a single gate is fully energized at each instant, said gate lying at the intersection of one row with one column, a signal source connected to all of said gates for passage of its energy through any fully energized gate, and means for registering the pattern of gates thus fully energized.

10. Apparatus for identifying a complex signal having a plurality of different frequency components which comprises means for segregating the higher frequency components of said signal from its lower frequency components, means for deriving a first control signal which bears a preassigned functional relation to said higher frequency components, means for deriving a second control signal which bears a preassigned functional relation to said lower frequency components, means for generating an energy beam, a beam-receptive area which is effectively subdivided into a plurality of elemental subareas, means for deflecting said beam in one coordinate direction in the plane of said area under control of said first control signal, means for deflecting said beam in another coordinate direction in the plane of said area under control of said second control signal, whereby said beam executes a trace on said area at a speed which depends on the rapidity of variation of said complex signal, the dwell of said beam on any subarea passed over by said trace being thus inversely related to the rapidity of variation of said complex signal, means aligned with each subarea and representing the expected dwell on said subarea of a trace executed by said beam under control of each of a preassigned group of reference signals, means comprising said beam and said aligned means for effectively multiplying the dwell of said beam on each of said subareas by each of said expected dwells to form, for each said subarea, an energy product, means for adding the products so formed for the several subareas to form, for each reference signal, a product sum, means for selecting the greatest one among said product sums, and means for identifying the reference signal contributing to said greatest product sum.

11. Apparatus for identifying a complex signal having components of at least two kinds which comprises means for segregating components of said signal of one kind from its components of another kind, means for deriving a first control signal which bears a preassigned functional relation to components of one kind, means for deriving a second control signal which bears a preassigned functional relation to components of said other kind, means for generating an energy beam, a beam-receptive area which is effectively subdivided into a plurality of elemental subareas, means for deflecting said beam in one coordinate direction in the plane of said area under control of said first control signal, means for deflecting said beam in another coordinate direction in the plane of said area under control of said second control signal, whereby said beam executes a trace on said area at a speed which depends on the rapidity of variation of said complex signal, the dwell of said beam on any subarea covered by said trace being thus inversely related to the rapidity of variation of said complex signal, means aligned with each subarea and representing the expected dwell on said subarea of a trace executed by said beam under control of each of a preassigned group of reference signals, means comprising said beam and said aligned means for effectively multiplying the dwell of said beam on each of said subareas by each of said expected dwells to form, for each said subarea, an energy product, means for adding the products so formed for the several subareas to form, for each reference signal, a product sum, means for selecting the greatest one among said product sums, and means for identifying the reference signal contributing to said greatest product sum.

12. Apparatus for identifying a complex signal as resembling one of a preassigned number of different reference signals more closely than it resembles any of the others which comprises means for analyzing said complex signal to segregate at least two significant features thereof, one from the other, means for deriving a first control signal which bears a preassigned functional relation to said first feature, means for deriving a second control signal which bears a preassigned functional relation to said second feature, means for generating an energy beam, a beam-receptive area which is effectively subdivided into a plurality of elemental subareas, means for deflecting said beam in one coordinate direction in the plane of said area under control of said first control signal, means for deflecting said beam in another coordinate direction in the plane of said area under control of said second control signal, whereby said beam executes a trace on said area at a speed which depends on the rapidity of variation of said complex signal, the dwell of said beam on any subarea covered by said trace being thus inversely related to the rapidity of variation of said complex signal, means aligned with each subarea and representing the expected dwell on said subarea of a trace executed by said beam under control of each of a preassigned group of reference signals, means comprising said beam and said aligned means for effectively multiplying the dwell of said beam on each of said subareas by each of said expected dwells to form, for each said subarea, an energy product, means for adding the products so formed for the several subareas to form, for each reference signal, a product sum, means for selecting the greatest one among said product sums, and means for identifying the reference signal contributing to said greatest product sum.

References Cited in the file of this patent

UNITED STATES PATENTS

| Number | Name | Date |
|---|---|---|
| 2,575,909 | Davis et al. | Nov. 20, 1951 |
| 2,575,910 | Mathes | Nov. 20, 1951 |
| 2,586,963 | Knutsen | Feb. 25, 1952 |